UNITED STATES PATENT OFFICE.

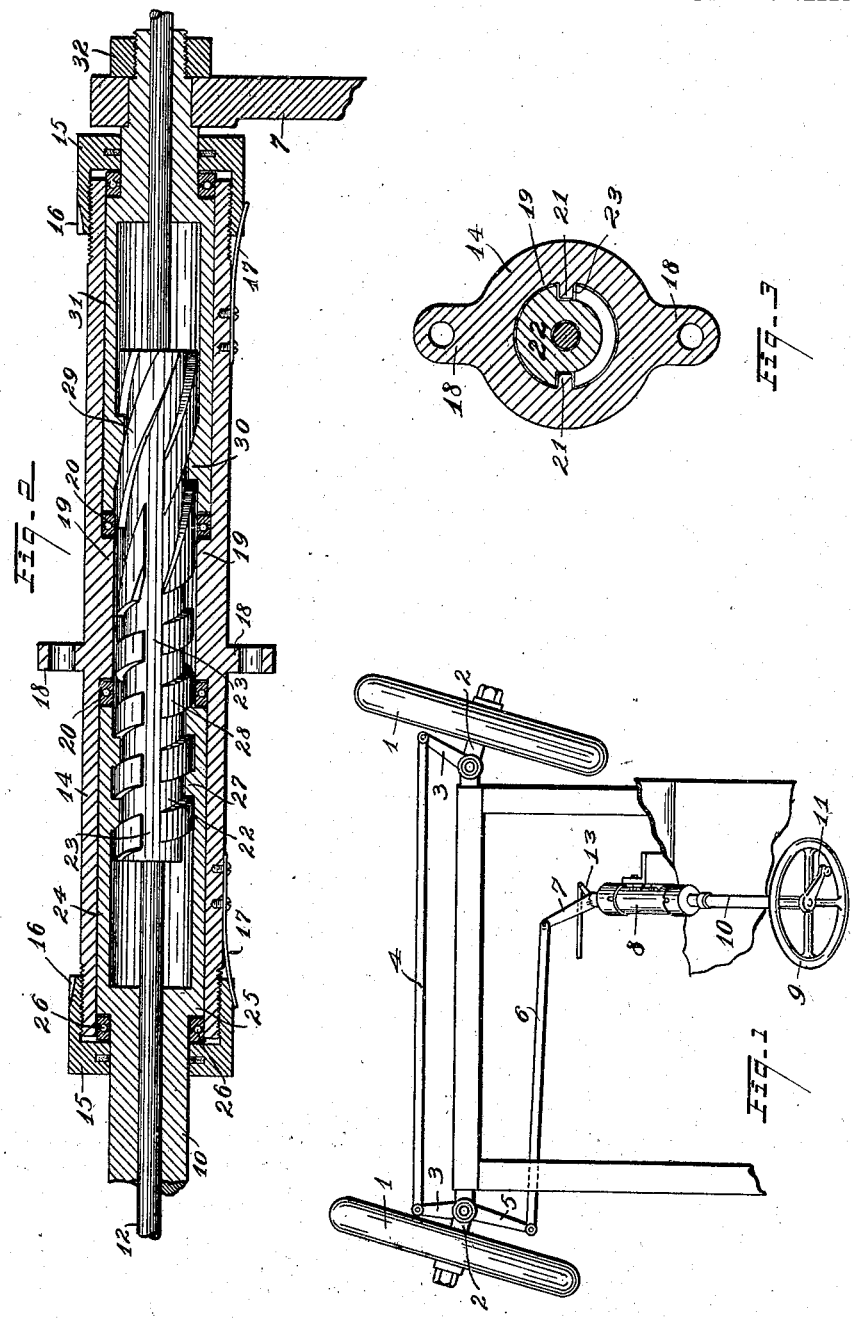

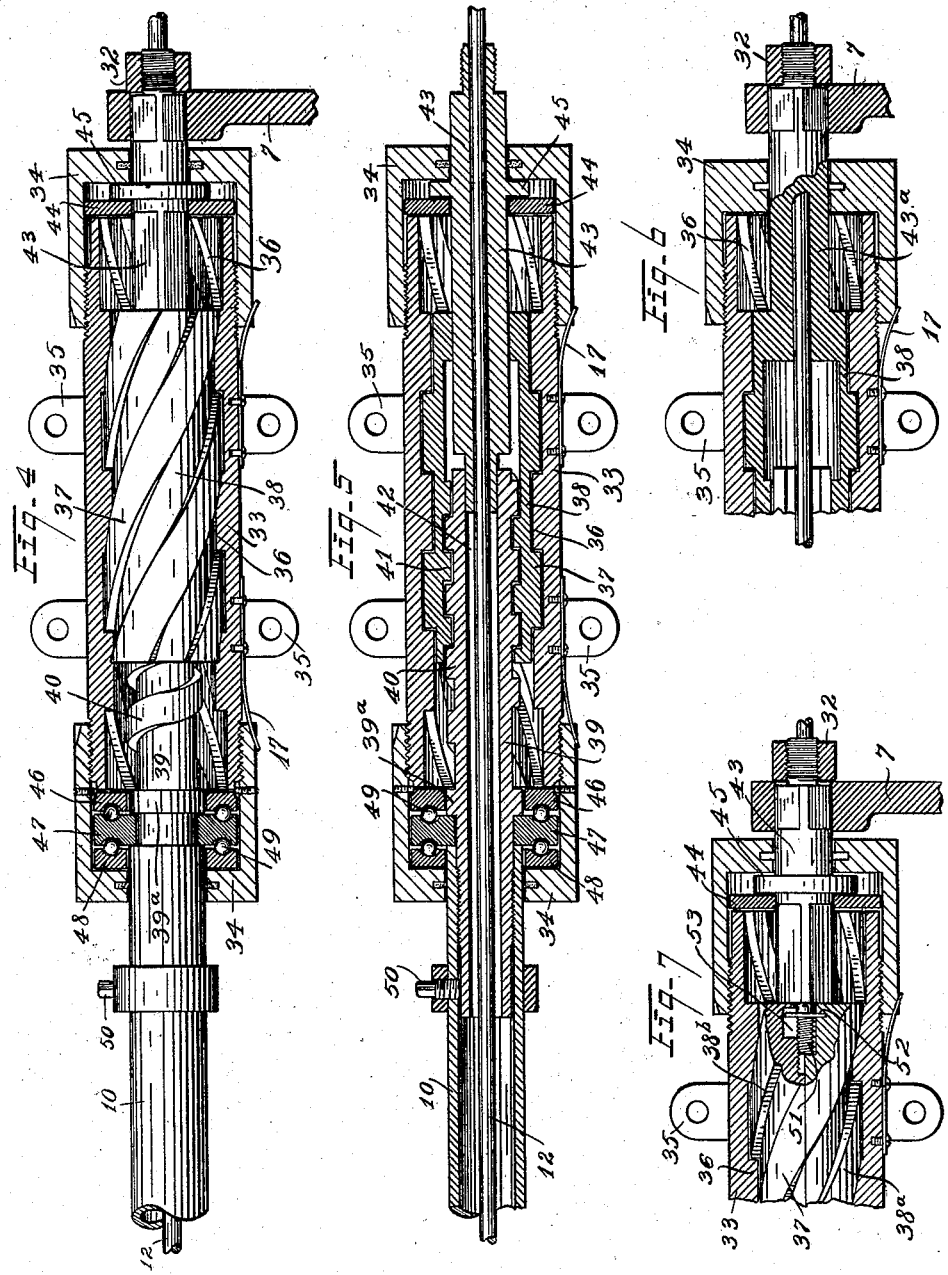

DAVID E. ROSS, OF BROOKSTON, INDIANA, ASSIGNOR TO ROSS GEAR AND TOOL COMPANY, OF LA FAYETTE, INDIANA, A CORPORATION OF INDIANA.

STEERING-GEAR FOR VEHICLES.

No. 923,583.      Specification of Letters Patent.      Patented June 1, 1909.

Application filed May 14, 1906. Serial No. 316,594.

*To all whom it may concern:*

Be it known that I, DAVID E. ROSS, a citizen of the United States, residing at Brookston, in the county of White and State of Indiana, have invented a certain new and useful Improvement in Steering-Gears for Vehicles, of which the following is a full, clear, and exact description, reference being had to the accompanying drawings.

This invention relates to steering gears for automobiles and the like, and it has for its object the production of a device of this character that shall be securely locked against backward movement, and that shall be simple in construction, efficient in operation, and compact in structure whereby the same may be used in such places on a vehicle as have not heretofore been available, owing to the size of the parts entering into the steering gear. With these objects in view, I have devised the form of steering mechanism shown in the accompanying drawings, in which—

Figure 1 is a plan view of a part of an automobile showing the manner in which my preferred from of invention is applied thereto. Fig. 2 is a longitudinal section through one form of steering gear, portions of the same being shown in elevation, Fig. 3 is a transverse section through the steering gear, shown in Fig. 2 taken substantially through the center of said figure. Fig. 4 is a longitudinal section through a modified form of a steering gear, the interior mechanism being shown in elevation. Fig. 5 is a view similar to Fig. 4 having all the parts therein shown in section. Fig. 6 is a modification of the form shown in Figs. 4 and 5 and Fig. 7 shows a form of steering gear like that shown in Fig. 4, but having means for taking up wear of the threads.

It will be understood that steering gears for automobiles and the like are required to be so constructed that if one of the wheels should strike an obstruction, the course of the automobile will not be deflected. In order to insure against such deflection, I make use of the principle of double screw threads, said screw threads being of different pitch, whereby the steering gear will be easily turned by the operator, but will be securely locked against movement in a backward direction.

Referring now to the drawings forming part of this application, 1—1 represent the front wheels of an automobile or like vehicle, said wheels being mounted upon the pivoted knuckles or stub shafts 2. These stub shafts are each provided with the ordinary steering arms 3 3, said steering arms being connected in front of the axle by a drag link bar 4. One of the steering arms has a rearwardly projecting crank arm 5 to which is connected in any suitable way the steering gear which forms the subject matter of my invention. As shown, this steering gear is connected to the arm 5 through the medium of a link 6 and crank arm 7.

As shown in Fig. 1, the steering gear proper is represented at 8, and the same is operated by means of a hand wheel 9 attached to the upper end of the steering shaft 10, said shaft being connected at its lower end to the mechanism proper of my steering gear. The steering gear is suitably supported in the vehicle; and, as will be understood, the form of connection between said gear and the steering arms on the stub axles will depend upon the particular form of vehicle to which it is applied. I have also indicated in Fig. 1, a hand lever 11 for controlling the engine or motor, said lever being attached to the upper end of a shaft 12, Fig. 2, that extends through the steering shaft 10 and the steering gear 8. To the lower end of this shaft 12 there is attached a crank arm 13 which is connected to the driving engine in a suitable manner, whereby the engine may be controlled by the simple movement of the hand lever 11. I simply show this as a convenient means of engine control, it being understood that any other means may be resorted to without affecting the principle upon which the steering gear operates.

Taking up first the form of steering gear shown in Fig. 2, 14 represents the stationary outside tubular member, to each end of which there is secured a dust proof bearing cap 15, said caps each being provided on their peripheries with notches 16 with which engage springs 17 secured to the tubular member 14. These springs, engaging in the notches, serve to prevent the displacement of the bearing caps. The tubular member is adapted to be attached to the vehicle frame by any suitable means, as by the eye-lugs 18, projecting from said member. Near its center the tubular member 14 is provided with an inward projecting flange 19, the ends of said flange forming seats for roller bearings 20 that will be hereinafter more specifically referred to. Projecting inwardly from the flanges 19 at diametrically opposite points are lugs 21, Fig. 3, said lugs forming keys to prevent the rotation of the double screw-threaded member 22. This member 22 is wholly within the tubular member 14, and has an endwise movement therein, although the same is prevented from rotation by the engagement of the keys 21 with slots 23 formed in the said member 22. Within one end of the tubular member 14, there is journaled a member 24, said member, in the construction illustrated in Fig. 2, forming a part of the steering shaft 10. Between the inner end of the member 24 and the flange 19 are located the ball bearings 20, heretofore referred to, and between the cap bearing 15, for that end of the member 14, and a shoulder 25 formed on the member 24, there are other ball bearings 26. With the construction thus described, the member 24 is permitted to have free rotation within the tubular member 14; but, at the same time, it is prevented from endwise motion therein. All wear on the bearings can be readily taken up by simply setting up on the cap plate 15. The inner end of the member 24 is hollow and is screw-threaded on its interior. These threads, which appear at 27, engage with threads 28 on one end of the double screw-threaded member 22, so that when the steering shaft and the member 24 are turned in either direction, the member 22 will have longitudinal movement imparted to it. On the opposite end of the member 22 from the threads 28, there are provided screw threads 29 having a very much longer pitch than the threads 28. These screw threads 29 are engaged by interior threads 30 on the member 31 that is mounted in the outer tubular member 14 in the same manner as has been described with reference to the member 24. This member 31 projects through the cap bearing 15 for that end of the steering gear, and carries on its lower end the arm 7, which is connected to the link 6 for turning the vehicle wheels. The crank arm 7 may be secured to the member 31 in any suitable way so as to insure that it will turn therewith, as by squaring the shaft or by providing the same with a key. The arm 7 is held in proper position on the member 31 by means of a nut 32. Instead of the crank arm 7, a pinion engaging with a segment may be employed. In fact I have simply elected to show a crank arm and link in this application as one form of construction between my steering mechanism and the steering knuckle, it being understood that I do not mean to limit my invention thereto. With this construction, it will be understood that when the member 24 is turned from the hand wheel 9, or in any other suitable manner, the double screw threaded member will be moved longitudinally but will be prevented from rotation. This longitudinal movement will cause the member 31 to be rotated through an angle much less than the angle through which the member 24 has been moved, this difference in angular movement being due to the difference in pitch between the screw threads on the double screw-threaded member. This difference in pitch may be varied as desired; and, as shown, it is in approximately the ratio of 1 to 4. Assuming, for purpose of illustration, that the pitch of the screw threads 29 is four times as great as that of the screw threads 28, it will be understood that the angular movement of the member 24 will be four times as great as that of the member 31, so that, in order to produce a rotation of the crank arm 7 through a given angle, it will be necessary to turn the hand wheel through an angle four times as great. Thus will any rotative effort exerted on the member 24 be multiplied fourfold on the member 31. On the other hand, however, if one of the vehicle wheels were to strike an obstruction tending to rotate the member 31, such rotation, if it were possible, would result in moving the member 22 endwise. But, since this member is in screw engagement with the member 24 with threads of relatively small pitch, the endwise movement of the member 22 would simply force the member 24 against one or the other of its end bearings, which would effectually lock the member 22 from end movement. Consequently, the member 31 cannot be turned by any force applied to the vehicle wheels, although said wheels can be easily turned when the force is applied in the opposite direction. The construction thus described, therefore, constitutes an efficient and absolute lock for preventing any back movement of the steering shaft.

Taking up the construction shown in Figs. 4 and 5, the outside tubular member is shown at 33, said member being closed at either end by cap plates 34, similar to those heretofore described, and being supported from the vehicle frame in any desirable manner, as by means of the eye-pieces 35. The interior of the member 33 is threaded with screw threads of relatively long pitch, as shown at 36, with which engage screw threads 37 on a longitudinally movable member 38. In this case the steering shaft 10 is secured to the outer end of a threaded member 39, the threads on said member being of much shorter pitch than the threads 36 and 37 on the members 33 and 38. The threads on the member 39 are represented at 40, and they engage with threads 41 on the interior of the member 38. The member 39 is hollow throughout its length, as shown at 42, said hollow at the inner end of the member forming a bearing for the inner end of a crank shaft 43. This shaft passes through the end of the member 38; and in order to drive the shaft from said member, the shaft is squared, and the opening for said shaft in the end of the member 38 is likewise squared so as to fit the shaft. This construction turns the shaft 43 with the member 38, although the latter is permitted to have longitudinal movement on the shaft. The member 39 and the shaft 43 have bearings at the ends of the tubular member 33, the bearings at the right hand end of said member consisting of the cap plate 34 and a plate or washer 44 that is held between the end of the member 33 and the thrust flange or ring 45 on the shaft 43, said flange bearing against the cap plate. The outer end bearing for the member 39 consists of rings or washers 46, 47 and 48, which are provided with raceways for balls 49. These rings are surrounded by the cap plate 34, and any wear on the bearings may be taken up by simply setting up on the cap screw. The ring 47 has a smaller central opening than the other rings of the bearings, and rests between a flange 39ª on the member 39 and the inner end of the tubular steering shaft 10. This ring, with the flange and the end of the steering shaft prevents endwise movement of the member 39. The steering shaft 10 is secured to the member 39 in any suitable manner, as by a set screw 50. With this construction, it will be understood that when the steering shaft 10 is rotated the member 39 will likewise be rotated; and, being incapable of end motion, the member 38, which is in screw-threaded engagement therewith, will be moved endwise. This endwise movement of the member 38 will necessitate the rotation of the latter because of its screw-threaded engagement with the tubular member 33; but, owing to the differences in the pitch of the screw threads on the interior and exterior of the member 38, its angular rotation will be much less than that of the member 39. As the shaft 43 carrying the crank arm 7 is rotated with and by the member 38, the movement of the crank arm will be small as compared with the movement of the steering shaft, said movement, in the device shown in the drawings, being in approximately the ratio of 1 to 4. From this description and illustration it will also be seen that the construction thus described is small and exceedingly compact, and that it serves to positively lock the steering gear against backward motion, except as the same is imparted by the operator.

In Fig. 6 I have shown a construction similar to that just described, except that the crank shaft 43ª is formed integral with the member 38 and, of course, partakes of the same longitudinal movement. As shown, the crank arm 7 will also move up and down with the member 38; but, owing to the length of the link 6, this movement will not interfere with the proper operation of the steering mechanism.

In Fig. 7 I have shown a construction like that shown in Fig. 4 except that I have provided means for taking up the wear of the screw threads 36 and 37. In order to do this I have divided the member 38 longitudinally through the center, forming parts 38ª and 38ᵇ. As will be understood, these parts will be held together by the member 33 when the steering gear is assembled, although they will be capable of a sliding movement with respect to each other in case the threads 36 and 37 have become worn so as to have any lost motion. When thus moved upon each other, the threads 37 will be caused to bear against the threads 36 and thus take up all wear that may have resulted. This sliding movement can be produced by any suitable mechanism, and as shown, I have provided a screw bolt 51 that is in threaded engagement with the part 38ᵇ, but that is in engagement with the part 38ª only through a flange 52 that is secured to said screw bolt and projects into a groove in the member 38ª. The part 38ᵇ is provided with a cavity 53 opposite the flange 52 so that the part may move back and forth without interference from said flange. In order to adjust the parts to take up wear, it is only necessary to turn the screw 51 which will cause the part 38ᵇ to slide on the part 38ª.

While I have shown the forms thus described as embodiments of my invention, the same principles that I employ may be capable of use in other forms of construction; and I desire it to be understood that the following claims are not intended to be limited to the specific mechanism shown and described any further than is necessitated by the specific terms employed or by the prior state of the art.

I claim:

1. In a steering gear for vehicles and the like, an operating member, a second member that is provided with a double set of screw threads, said screw threads being of different pitch, means operated from the operating member for engaging the threads of shorter pitch, a third member turned by the threads of lower pitch, and means connecting the latter member with a steering knuckle of the vehicle.

2. In a steering gear for vehicles and the like, a hand operated member, a second member that is provided with a double set of screw threads, said screw threads being of different pitch, means operated from the hand operated member for engaging the threads of shorter pitch whereby, when the hand operated member is operated, the said second member will be moved longitudinally, a third member that is turned by the threads of longer pitch, and means connecting the latter member with a steering knuckle of the vehicle.

3. In a steering gear for vehicles and the like, a steering shaft, a member that is provided with a double set of screw threads, said screw threads being of different pitch, means operated from the said steering shaft for engaging the threads of shorter pitch, a member operated by the threads of higher pitch, and means connecting the latter member with a steering knuckle of the vehicle.

4. In a steering device for vehicles and the like, a steering shaft, a member that is provided with sets of screw threads of different pitch, means connected with the steering shaft and engaging with the threads of shorter pitch, whereby, when the steering shaft is turned, said member will move longitudinally, a crank arm that is turned by the screw threads of longer pitch, and connections between said crank arm and a steering knuckle of the vehicle.

5. In a steering mechanism for vehicles and the like, an operating member, an outer tubular member, a double screw threaded member within the said tubular member, the threads on said member being of different pitch, means connected with the operating member and engaging with the threads of lower pitch on the said double screw threaded member, whereby the latter is moved longitudinally within the tubular member, a steering knuckle for the vehicle, and means connecting the said knuckle with the said double screw threaded member, whereby the longitudinal movement of the latter causes the steering knuckle to be turned.

6. In a steering mechanism for vehicles and the like, a steering shaft, an outer tubular member, a double screw threaded member within the said tubular member, and threads on said member being of different pitch means connected with the steering shaft and engaging with the threads of shorter pitch on the said double screw threaded member, whereby the latter is moved longitudinally within the tubular member when the steering shaft is operated, a steering knuckle for the vehicle and means connecting the steering knuckle with the said double screw threaded member, whereby the longitudinal movement of the latter causes the steering knuckle to be turned.

7. In a steering mechanism for vehicles and the like, an operating member, an outer tubular member that is stationarily mounted in the vehicle, a double screw threaded member having threads of different pitch within the said tubular member, means connected with the operating member and engaging with the threads of shorter pitch on the said double screw threaded member whereby the latter is moved longitudinally within the tubular member when the operating member is operated, a steering knuckle for the vehicle, a crank arm, means connecting the crank arm with the said double screw threaded member, whereby the longitudinal movement of the latter turns the crank-arm and connections between the crank-arm and the steering knuckle.

8. In a steering device for vehicles and the like, an operating member, an outer tubular member that is provided on its interior with screw threads of relatively long pitch, a second member mounted within the tubular member having threads on its exterior engaging with the interior threads of the tubular member, said second member being provided with threads of relatively short pitch on its interior, a third member having screw threads engaging with the interior threads of the said second member, said third member being turned from the operating member, and means connecting the second member with the steering wheel of the vehicle.

9. In a steering device for vehicles and the like, a steering shaft, an outer tubular member that is provided on its interior with screw threads of relatively long pitch, a second member mounted within the tubular member having threads on its exterior engaging with the interior threads of the tubular member, said second member being provided with threads of relatively short pitch on its interior, a third member having screw threads engaging with the interior threads of the said second member, said third member being turned from the steering shaft, and means connecting the second member with the steering knuckle of the vehicle.

10. In a steering device for vehicles and the like, a steering wheel, an outer tubular member stationarily mounted in the vehicle and provided on its interior with screw threads of relatively long pitch, a second member mounted within the tubular member having threads on its exterior engaging with the interior threads of the tubular member, said second member being provided with threads of relatively short pitch on its interior, a third member having screw threads engaging with the interior threads of the said second member, said third member being turned from the steering shaft, a crank-arm driven from the said second member, and means connecting the crank arm with the steering knuckle of the vehicle.

11. In steering mechanism for vehicles and the like, an operating device, an outer tubular member that is stationarily mounted in the vehicle, said member being provided with screw threads of relatively long pitch, a second member within the tubular member, said second member being provided with screw threads engaging those on the interior of the tubular member, said second member being provided on its interior with screw threads of relatively short pitch, a third member connected to said operating device and provided with screw threads engaging those on the interior of the second member, whereby when the said device is operated the said second member will be caused to move longitudinally within and to be rotated by the tubular member, and means connecting the said second member with a steering knuckle of the vehicle.

12. In a steering device for vehicles and the like, an outer tubular member that is stationarily mounted in the vehicle, said member being provided with screw threads of relatively long pitch, a second member within the tubular member, said second member being shorter than the tubular member and provided with screw threads engaging those on the interior of the tubular member, said second member being also provided on its interior with screw threads of relatively short pitch, a steering shaft, a third member connected to said steering shaft and provided with screw threads engaging those on the interior of the second member, whereby when the steering shaft is turned the said second member will be moved longitudinally within and be rotated by the tubular member, and means connecting the said second member with a steering knuckle of the vehicle.

13. In a steering device for vehicles and the like, an outer tubular member that is stationarily mounted in the vehicle, said member being provided with screw threads of relatively long pitch, a second member within the tubular member, said second member being provided with screw threads engaging those on the interior of the tubular member, said second member being provided on its interior with screw threads of relatively short pitch, a steering shaft, a third member connected to said steering shaft and provided with screw threads engaging those on the interior of the second member, whereby when the steering shaft is turned the said second member will be caused to move longitudinally and to be rotated by the tubular member, a crank-shaft projecting into the tubular member and having driving engagement with the said second member, and means connecting the crank-shaft with a steering knuckle of the vehicle.

14. In a steering device for vehicles and the like, an operating device, a steering knuckle for the vehicle, and connections between the operating device and the steering knuckle said connections including a double screw threaded member having threads of different pitch, the threads of short pitch being connected with the operating device and the threads of long pitch controlling the steering knuckle whereby the threads of small pitch act as a back lock for the steering knuckle.

15. In a steering device for vehicles and the like, an operating device, a steering wheel for the vehicle, a double screw threaded member having threads of different pitch, connections between the threads of short pitch and the operating device, and connections between the threads of long pitch and the steering wheel, whereby the movement of the operating device causes a relatively small movement of the steering wheel and the threads of short pitch act as a lock against backward movement of the steering wheel.

16. In a steering device for vehicles and the like, an outer tubular member, a second member longitudinally movable within the tubular member and provided with screw threads of different pitch, a third member projecting into the tubular member and engaging with the threads of shorter pitch of the said second member, means for turning said third member, means to prevent the said third member from moving longitudinally, and means whereby the longer threads of the said second member are caused to turn a steering wheel of the vehicle.

17. In a steering device for vehicles and the like, a stationary outer tubular member, a second member longitudinally movable within the tubular member and provided with screw threads of different pitch, a third member projecting into the tubular member and engaging with the threads of shorter pitch of the said second member, means for turning said third member, means to prevent the said third member from moving longitudinally, a crank shaft driven by the said second member, and means whereby the crank-shaft is caused to turn the steering knuckle of the vehicle.

18. In a steering device for vehicles and the like, a stationary outer tubular member, a second member longitudinally movable within the tubular member and provided with screw threads of different pitch, a third member projecting into the tubular member and engaging with the threads of shorter pitch of the said second member, means for turning said third member, a crank-shaft projecting into the tubular member, means to prevent the said third member and crank-shaft from moving longitudinally, driving connections between the third member and the crank-shaft, and connections between the crank-shaft and a steering knuckle of the vehicle.

19. In a steering device for vehicles and the like, an outer tubular member that is stationarily mounted in the frame of the vehicle, said member being provided with interior screw threads, a second member within the tubular member and having screw threads engaging with those in the tubular member, said second member being provided with interior screw threads of relatively small pitch, a third member having screw threaded engagement with the threads on the interior of said second member, means for turning said third member, means for preventing longitudinal movement of the said third member, whereby, when the steering shaft is turned, the second member will be caused to move longitudinally within the tubular member and to rotate therein, a shaft projecting into the tubular member and having a driving connection with the said second member, and means connecting the said shaft with a steering wheel of the vehicle.

20. In a steering device for vehicles and the like, a steering shaft, an outer tubular member that is stationarily mounted in the frame of the vehicle, said member being provided with interior screw threads, a second member within the tubular member and having screw threads engaging with those in the tubular member, said second member being provided with interior screw threads of relatively small pitch, a third member connected with the steering shaft of the vehicle and having screw threaded engagement with the threads on the interior of said second member, means for preventing longitudinal movement of the said third member whereby, when the steering shaft is turned, said second member will be caused to move longitudinally within the tubular member and to rotate therein, a shaft projecting into the tubular member and having a driving connection with the said second member, and means connecting the said shaft with a steering knuckle of the vehicle.

21. In a steering device for vehicles and the like, a steering shaft, an outer tubular member that is stationarily mounted in a frame of the vehicle, said member being provided with interior screw threads, a second member within the tubular member and having screw threads engaging with those on the tubular member, said second member being provided with interior screw threads of relatively small pitch, a third member connected with the steering shaft on the vehicle and having screw threaded engagement with the threads on the interior of said member, means for preventing longitudinal movement of the said third member, whereby, when the steering shaft is turned, said second member will be caused to move longitudinally within the tubular member, a squared shaft projecting into the tubular member and loosely entering a squared opening in the said second member, and means connecting the said shaft with a steering knuckle of the vehicle.

22. As a means for taking up lost motion between members having screw-threaded engagement, the combination of a member having threads on its interior, and a member having external screw threads engaging therewith, one of said members being divided longitudinally, and means for moving one of the parts of said divided member relatively to the other part so as to bring the threads on said parts into close engagement with the threads of the other member.

23. As a means for taking up lost motion between members having screw-threaded engagement, the combination of a member having threads on its interior, and a member having external screw threads engaging therewith, said latter member being divided longitudinally, and means for moving one of the parts of said latter member relatively to the other part so as to bring the threads on said parts into close engagement with the threads of the other member.

24. As a means for taking up lost motion between members having screw-threaded engagement, the combination of a member having threads on its interior, and a member having external screw threads engaging therewith, said latter member being divided longitudinally, and a screw having threaded engagement with one of the parts of the divided member and abutting engagement with the other part thereof, whereby, when the screw is turned the said parts will be moved relatively and the threads thereon will be brought into close engagement with the threads on the other member.

25. In a steering device for vehicles and the like, an operating device, a steering knuckle for the vehicle, a double screw-threaded member having threads of different pitch, connections between the threads of shorter pitch and the operating device, connections between the threads of longer pitch and the steering knuckle, whereby the movement of the operating device causes a relatively small movement of the steering knuckle and the threads of shorter pitch act as a lock against backward movement of the steering knuckle, and means for taking up lost motion between one of the sets of threads and its operating connections.

In testimony whereof, I hereunto affix my signature in the presence of two witnesses.

DAVID E. ROSS.

Witnesses:
J. H. KNEALE,
J. H. JOHNSON.